United States Patent [19]

Matsuda

[11] Patent Number: 4,965,340
[45] Date of Patent: Oct. 23, 1990

[54] COPOLYMER FROM SULFUR DIOXIDE AND VINYL COMPOUND
[75] Inventor: Minoru Matsuda, Sendaishi, Japan
[73] Assignee: Chisso Corporation, Osaka, Japan
[21] Appl. No.: 297,487
[22] Filed: Jan. 17, 1989

Related U.S. Application Data
[63] Continuation of Ser. No. 59,927, Jun. 9, 1987, abandoned.
[51] Int. Cl.$^5$ .............................................. C08G 75/00
[52] U.S. Cl. .................... 528/382; 156/659.1; 528/25; 528/26; 528/29; 528/32
[58] Field of Search ..................... 528/382, 25, 26, 29, 528/32

[56] References Cited
U.S. PATENT DOCUMENTS
3,890,287  6/1975  Moore et al. ...................... 528/382

Primary Examiner—Harold D. Anderson
Attorney, Agent, or Firm—Fred Philpitt

[57] ABSTRACT

A novel copolymer useful as an active ingredient for a positive type resist material to be decomposed by electron beam or X-rays with a high sensitivity and having a superior resistance to dry etching, a process for producing the copolymer and a resist material containing the copolymer are provided, which copolymer consists of 1 to 50% by mol of structural units of

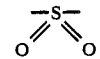

and 50 to 99% by mol of structural units of one or more vinyl compounds at least one of which is an aromatic ring-containing vinyl compound and having a number average molecular weight of 500 to 500,000.

8 Claims, 5 Drawing Sheets

COPOLYMER FROM SULFUR DIOXIDE AND VINYL COMPOUND

This is a continuation of application Ser. No. 059,927 filed June 9, 1987 abandoned and the benefits of 35 USC 120 are claimed relative to it.

BACKGROUND INVENTION

1. Field of the Invention

This invention relates to a novel copolymer comprising sulfur dioxide and at least one vinyl compound. More particularly it relates to a novel resist material of a positive type to be decomposed by electron beam or X-rays with a high sensitivity, and having a superior durability to dry etching, and the above-mentioned copolymer used as an active ingredient for the above-mentioned resist material, and further a process for producing the same.

2. Description of the Related Art

Advance of LSI (large scale integrated circuitry) in several recent years is remarkable and a high performance has been required for resist materials used for lithography of IC. The high performance referred to herein means that the materials are highly sensitive to light, electron beam and X-rays and have a high resolution degree. More recently, in the field of IC technique, a dry etching process has come to occupy the main current in place of conventional wet etching, and thus it has come to be required for resist materials to have a superior durability to dry etching.

In general, plasma etching is superior in fine resolution degree, reproducibility and operability to chemical etching, and further, has an advantage that stains formed in the use of chemical etchants or handling problem do not occur.

Now, as conventional high molecular materials for positive type electron beam resists, polyolefinsulfone, polymethyl methacrylate, etc. have been known ("Precision fine processing in electronics" edited by Seii Naraoka, and issued by Sogodenshi Shuppansha, 1983). However, many positive type resist materials cannot endure plasma discharge. Thus, chemical etching has generally been employed in spite of the above-mentioned drawbacks.

Thus, development of a positive type resist having a superior plasma etching durability has been urgently desired.

Now, resist materials having a superior resistance to oxygen plasma etching can be obtained by preparing Si-containing polymers.

The reason has been said to consist in that resist films obtained from Si atoms-containing polymers degrade by means of oxygen plasma to form a thin metal oxide layer on the surface of the film, which layer constitutes a barrier layer against the oxygen plasma ((Silicone resist) "Electron materials", edited by Kei Murase, July, 1985).

In another fact, it has been known that resists having an aromatic ring in the structure thereof have a high resistance to dry etching. For example, as an electron beam negative resist for dry etching, polystyrene, polychloromethylstyrene, etc. have been known.

As an electron beam positive resist, poly((styrene)$_p$-sulfone) has been known. This resist has a high resistance to dry etching, but its sensitivity is low.

SUMMARY OF THE INVENTION

The present inventors have developed a copolymer consisting of sulfur dioxide and a vinyl compound containing an aromatic ring-and/or Si-containing compound, and a copolymer consisting of sulfur dioxide, an olefin and a vinyl compound containing an aromatic ring-and/or Si-containing compound.

The present inventors have found that these copolymers have a superior solubility in general-purpose solvents and also have a superior sensitivity and resistance to dry etching suitable as a resist material for UV rays, electron beam and X-rays.

The present inventors have found the following most specific features:

(1) The above-mentioned poly((styrene)$_2$-sulfone) has a low sentivity to electron beam, whereas in the present invention, by making the molar ratio of a composition of structural units expressed by the formula

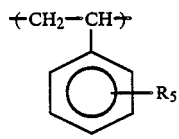

to structural units expressed by the formula

come close to 1, improvement in the sensitivity thereto has been realized.

(2) The poly(styrene-sulfone) is insoluble is general-purpose solvents, whereas the copolymers of multicomponents of the present invention have a superior solubility in general-purpose solvents, and the so-called alternating copolymers expressed by the formula

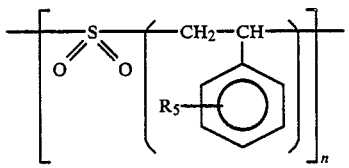

are also soluble in general-purpose solvents.

(3) The copolymers of the present invention contain an aromatic ring-and/or Si-containing compound and are superior in the resistance to dry etching. As described later in Examples, as compared with poly(butene-1-sulfone), poly(olefin-trialkylsilylstyrene-sulfone), etc. have a good sensitivity to UV rays, electron beam and X-rays and a good resistance to dry etching and hence are useful for positive type resists.

As apparent from the foregoing, a first object of the present invention is to provide a novel copolymer of sulfur dioxide with a vinyl monomer having a resistance to plasma etching and a process for producing the same.

A second object of the present invention is to provide an application field (positive type resist material) of such a copolymer.

The present invention resides in the following items (1)–(7) in a first aspect; and in the following item (8) in a second aspect; and further in the following items (9)–(11):

(1) A copolymer consisting of 1 to 50% by mol of structural units of

and 50 to 99% by mol of structural units of one or more vinyl compounds at least one of which is an aromatic ring-containing vinyl compound and having a number average molecular weight of 500 to 500,000.

(2) A copolymer according to item (1) wherein said aromatic ring-containing vinyl compound is at least one member selected from the group consisting of styrene, chlorostyrene, chloromethylstyrene, acetoxystyrene and hydroxystyrene.

(3) A copolymer according to item (1) wherein said one or more vinyl compounds further comprise an aliphatic olefin hydrocarbon as an indispensable component.

(4) A copolymer according to item (1) wherein said one or more vinyl compounds comprise ① at least one member of aromatic ring-containing compounds selected from the group consisting of styrene, chlorostyrene, acetoxystyrene, hydroxystyrene and trimethylsilylstyrene, ② at least one member of aliphatic olefin hydrocarbons selected from the group consisting of 1-butene, 2-methyl-1-butene and 2-methyl-1-pentene and ③ at least one member of silicon compounds selected from the group consisting of trimethylvinylsilane and trimethylallylsilane.

(5) A copolymer according to item (1) wherein said copolymer is a linear copolymer and said one or more vinyl compounds are a trialkylsilyl group-substituted styrene expressed by the formula

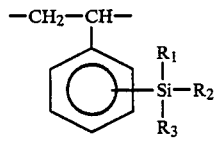

wherein $R_1$, $R_2$ and $R_3$ each are a lower alkyl group.

(6) A copolymer according to item (5) wherein said trialkylsilyl group is bonded to the nucleus of said trialkylsilyl group-substituted styrene at its o-, m- or p-position, and said $R_1$, $R_2$ and $R_3$ each are selected from the group consisting of methyl, ethyl and propyl.

(7) A copolymer according to item (5) having repetition units expressed by the formula (I)

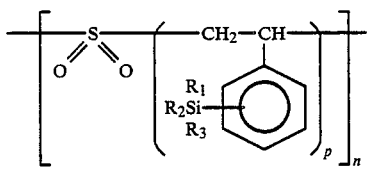

wherein p represents a sequence length of 1 to 5 and n represents an integer of 10 to 25,000.

(8) A process for producing a nucleus-substituted trialkylsilylstyrene-sulfone linear copolymer, which process comprises copolymerizing sulfur dioxide with a nucleus-substituted trialkylsilylstyrene expressed by the formula

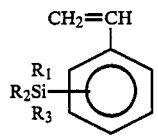

wherein $R_1$, $R_2$ and $R_3$ each are a lower alkyl group by means of a photoirradiation or an initiator at a temperature of $-100°$ to $+40°$ C., to obtain a linear copolymer having repetition units of the formula (I)

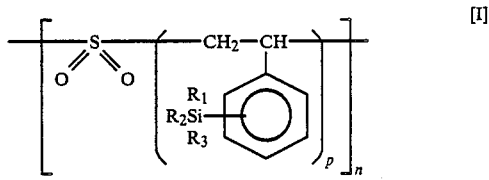

wherein p represents a sequence length of 1 to 2, n represents an integer of 10 to 25,000 and $R_1$, $R_2$ and $R_3$ each are as defined above.

(9) A positive type resist material comprising as an active ingredient, a nucleus-substituted trialkylsilylstyrene-sulfone linear copolymer composed of 30 to 50% by mol of structural units of

and 50 to 70% by mol of structural units of

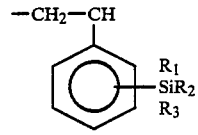

wherein $R_1$, $R_2$ and $R_3$ each represent a lower alkyl group, and having a number average molecular weight of 500 to 500,000.

(10) A positive type resist material comprising as an active ingredient, a copolymer of three or more monomers comprising 30 to 50% by mol of structural units of

and 50 to 70% by mol of structural units of at least two vinyl compounds and having a number average molecular weight of 25,000 to 500,000, said at least two vinyl compounds comprising ① at least one aromatic ring-containing vinyl compound and ② at least one aliphatic olefin hydrocarbon as indispensable structural units and ③ a Si-containing vinyl compound as optional structural units.

(11) A positive type resist material according to item (10) wherein said at least one aromatic ring-containing vinyl compound ① is at least one member selected from the group consisting of styrene, chlorostyrene, acetoxystyrene, hydroxystyrene and trimethylsilylstyrene; said at least one aliphatic olefin hydrocarbon is at least one member selected from the group consisting of 1-butene, 2-methyl-1-butene and 2-methyl-1-pentene; and said Si-containing vinyl compound ③ is at least one member selected from the group consisting of trimethylvinylsilane and trimethylallylsilane.

BRIEF DESCRIPTION OF THE DRAWINGS

FIG. 1 shows the spectra of the copolymer obtained in Example 1.

FIG. 2 shows the spectra of the copolymer obtained in Example 3.

FIG. 3 shows the spectra of the copolymer obtained in Example 4.

FIG. 4 shows the spectra of the copolymer obtained in Example 5.

FIG. 5 shows the spectra of the copolymer obtained in Example 6.

DETAILED DESCRIPTION OF PREFERRED EMBODIMENTS

Figure 1:
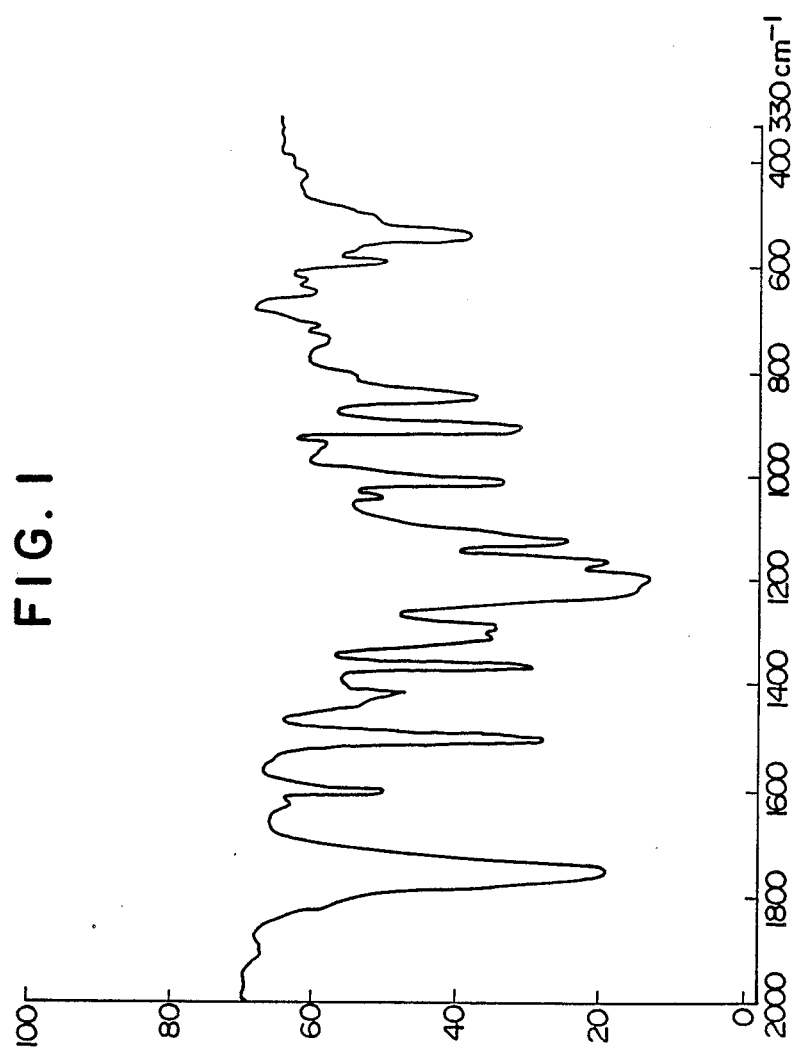
FIGS. 1-5 each show the infrared absorption spectra of the copolymer of the present invention.

The present invention will be described below in details.

The copolymer of the present invention is a linear high-molecular weight compound expressed by the formula (II)

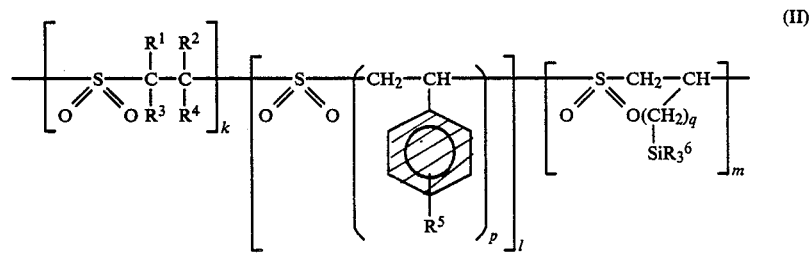

(II)

wherein $R_1$, $R_2$, $R_3$ and $R_4$ each represent H, $CH_3$, $C_2H_5$, $C_3H_7$, $C_4H_9$ or $C_5H_{11}$ and may be the same or different; $R_5$ represents H, Cl, $OCOCH_3$, OH or $SiR_3^6$ wherein $R^6$ represents $CH_3$, $C_2H_5$ or $C_3H_7$;

represents a monocyclic or polycyclic aromatic ring; p represents 1 to 10 in terms of the number of sequence units and q represents 0 to 4 in terms of the number thereof; k, l and m each correspond to the molar fraction of these structural units and each indicate that these structural units are irregularly distributed in the polymer and copolymerized. In addition, the case of k=m=0 refers to a bipolymer.

The structural unit ② expressed by

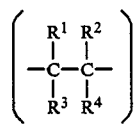

in the formula (II) includes 1-butene, 2-methyl-1-butene, 2-methyl-1-pentene, 2-pentene (including cis or trans form), 1-hexene, 1-heptene, etc.

The structural units ① and ③ expressed by

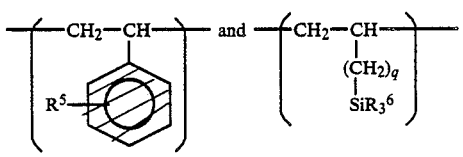

in the formula( II) include 1-vinylnaphthalene, 2-vinylnaphthalene, styrene, chlorostyrene, acetoxystyrene, hydroxystyrene, trimethylsilylstyrene, as the former structural unit, and trimethylvinylsilane, trimethylallylsilane, as the latter structural unit.

The copolymer of the present invention can be produced according to known radical polymerization process or redox system polymerization process, using sulfur dioxide, at least one kind of compounds of the above-mentioned structural unit ① and as optional component(s), at least one kind of compounds of the above structural units ② and ③ as raw materials.

The composition of the copolymer of the present invention can be controlled by choice, blending proportion and polymerization temperature of sulfur dioxide and the above-mentioned vinyl compounds, and the molecular weight of the copolymer can be controlled by adequately choosing the kind and quantity of polymerization initiator and polymerization temperature.

As the polymerization initiator, any of those known for free radical polymerization are usable. Preferred examples thereof are azobisisobutyronitrile, t-butyl hydroperoxide, di-t-butyl peroxide, etc. Further, the copolymer of the present invention can also be obtained by photoirradiation.

In either of the cases, it is possible to obtain the copolymer having an aimed molecular weight by adjusting the quantity of polymerization initiator used or the dose of photoirradiation used. The practical quantity of the initiator used has no particular limitation, but usually it is in the range of 1 to 100 mmol/l.

As to the polymerization temperature, a definite temperature can be chosen in the range of $-100°$ to $100°$ C. depending on aimed molecular weights and desired composition ratios shown in the above formula (II), Here, in the formula (II), the respective composition ratios of the olefin-sulfone part and the

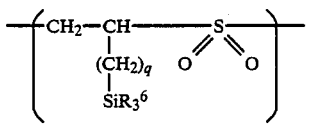

part do not depend on the polymerization temperature and are about 1:1, whereas the composition ratio of the part

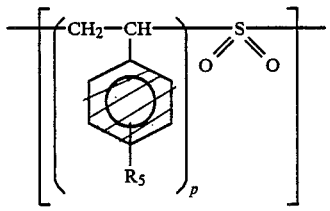

depends on the polymerization temperature, and the lower the polymerization temperature, the less the value of p, i.e. the closer the ratio to 1 : 1.

On the other hand, when the copolymer of the present invention is used for electron beam or X-ray resist, as to the sensitivity of decomposition by the electron beam or X-ray irradiation, the closer the p value to 1 to 2, preferably 1, the more the sensitivity improved. Thus, particularly when a bipolymer among the copolymers of the present invention is used for the resist, the polymerization temperature is preferred to be in the range of +30° to −100° C.

The copolymerization reaction in the process of the present invention may be carried out according to bulk polymerization or solution polymerization. The solvent used in the solution polymerization process has no particular limitation, but usually those such as chlorobenzene, o-dichlorobenzene, dichloromethane, etc. are preferred.

The time required for the copolymerization reaction varies depending on other copolymerization conditions, but usually it is in the range of 1 to 120 hours, preferably 4 to 48 hours. After the copolymerization, unreacted monomers, solvent, etc. are removed in a conventional manner to obtain a copolymer in the form of solids or if necessary, a copolymer in the form of solution.

As described above, by adequately choosing the kind and quantity of polymerization initiator, polymerization temperature and polymerization solvent, it is possible to obtain a copolymer having a number-average molecular weight of 500 to 500,000 and a definite structural unit composition ratio.

When the copolymer of the present invention is used for the resist material, its molecular weight has an influence upon the performance of the material, and its number-average molecular weight is preferred to be in the range of 25,000 to 500,000 although this range is not decisive in the aspect& of its performance.

The copolymer of the present invention can be uniformly coated onto a substrate in the form of solution of a suitable organic solvent according to spray or spin coating process. As to the solution, usually those having a concentration of about 3 to 20% by weight, preferably about 4 to 10% by weight in terms of the concentration of the copolymer are used. As preferred solvent, those having a boiling point lower than the decomposition temperature of the copolymer are used. For example, dioxane, chlorobenzene, methyl cellosolve acetate (MCA), etc. are preferred.

When the copolymer of the present invention is used as the resist material, the following embodiment may be carried out:

The above-mentioned solvent solution of the copolymer i.e. a resist solution is subjected to spin coating onto a substrate, followed by vaporizing off the solvent contained in the coated material on heating to form a uniform resist film. The film is preferred to have a thickness of 0.2 μ to 1 μm. The thus obtained film is subjected to controlled irradiation of electron beam or X-rays to decompose the irradiated areas, followed by dissolving the resulting irradiated areas with a suitable developer as mentioned later to effect development.

Examples of suitable developer are mixed solvents of a good solvent such as amyl acetate, methyl cellosolve acetate, chlorobenzene, cyclopentanone, dioxane, tetrahydrofuran, etc. with a poor solvent such as 2-methoxyethanol, isopropanol, etc. in a suitable proportion e.g. in the range of good solvent 10: poor solvent 1 to good solvent 1: poor solvent 10, each ratio being by volume.

The resist film having a silyl group and/or an aromatic ring causes decomposition by plasma etching and at the same time causes crosslinking of the aromatic ring with each other to form a barrier layer. Further, the silyl group is oxidized by oxygen plasma to form a $SiO_x$ layer on the surface of the resist layer and thereby form a barrier layer so that more excellent resistance to plasma is exhibited.

As shown in Test examples mentioned later, resists containing in the copolymer of the present invention, compounds having a silyl group and/or an aromatic ring (structural units ① and ③ such as styrene, chlorostyrene, chloromethylstyrene, acetoxystyrene, hydroxystyrene, ① trimethylsilylstyrene, ③ trimethylvinylsilane, trimethylallylsilane, etc. have a superior dry-etching durability. Further, in the copolymer of the present invention, when the above structural units   and   are copolymerized together in 10 to 30% by mol, it is possible to fully achieve the object.

The present invention will be described in more detail by way of Examples.

The present invention should not be construed to be limited thereto.

As to the weight-average molecular weight ($M_W$) and polydispersibility (d) referred to in these Examples, the corresponding number-average molecular weight ($M_N$) can be calculated from the following equation:

$$\frac{M_W}{M_N} = d$$

EXAMPLE 1

Into a 100 ml pressure glass tube were introduced newly distilled p-acetoxystyrene (20 g) and azobisisobutyronitrile (22 mg), followed by removing oxygen inside the tube by repeated vacuum degassings under freezing of the contents inside the tube, then adding liquefied $SO_2$ (−10° C.) (5.4 ml) obtained by dehydration and drying with $P_2O_5$, sealing the tube, sufficiently mixing the contents, polymerizing the contents at 60° C. for 100 minutes, then quenching down to 0° C. or lower to terminate the polymerization reaction, opening the tube, discharging unreacted $SO_2$, dissolving the reaction mixture in tetrahydrofuran (THF), pouring the resulting solution in excess methanol to obtain a powdery polymer, filtering the polymer, dissolving it in THF, pouring the solution in methanol, twice repeating this procedure and drying the polymer in vacuum at 30° for 24 hours (yield: 3.8 g). The IR spectra of this polymer are shown in FIG. 1. It was found from the IR spectra and elementary analysis values of the polymer that the polymer was a bipolymer of p-acetoxystyrenesulfone and had a composition of 67% by mol of p-acetoxystyrene unit and 33% by mol of $SO_2$ unit. Further, this bipolymer was subjected to GPC analysis to give a weight-average molecular weight of 390,000 as calculated in terms of polystyrene and a polydispersibility of 1.8.

EXAMPLE 2

Dioxane (60 ml) was placed in a 200 ml conical flask, followed by adding thereto p-acetoxystyrene-sulfone copolymer (2 g) obtained in Example 1, agitating the mixture for a long time to prepare a uniform solution, adding 1N hydrochloric acid aqueous solution (4 ml) to the solution, agitating the mixture at room temperature for 24 hours for hydrolysis, adding to the resulting solution, dichloromethane (40 ml), transferring the solvent layer into a separating funnel, washing the layer with a large quantity of water to make the layer neutral, and introducing the neutralized solvent layer into a large quantity of hexane to precipitate the polymer. The resulting polymer was subjected to IR spectra analysis. As a result, most of acetoxy group was extinct and the polymer was a p-hydroxystyrene-sulfone bipolymer.

In addition, even according to the process shown in Example 1, wherein p-hydroxystyrene and $SO_2$ were subjected to polymerization reaction in the presence of a polymerization initiator, it was also possible to obtain the p-hydroxystyrene-sulfone bipolymer, but since p-hydroxystyrene homopolymer is coexistent with the above bipolymer, it is necessary to separate the homopolymer.

EXAMPLE 3

Figure 2:
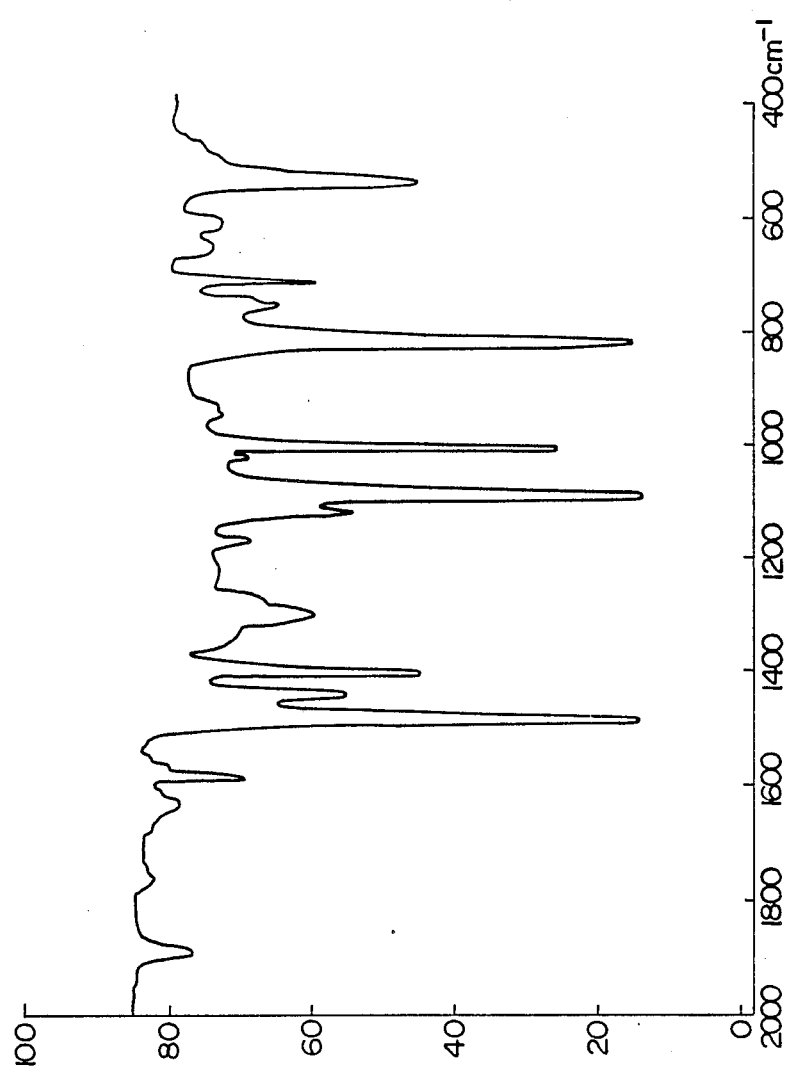

Into a 100 ml pressure glass tube were introduced newly distilled p-chlorostyrene (38 ml) and azobisisobutyronitrile (40 mg), followed by removing oxygen inside the tube in the same manner as in Example 1, adding $SO_2$ ($-10°$ C.) (9 ml), sufficiently mixing the contents, reacting the contents at 30° C. for 19 hours and carrying out post-treatment in the same manner as in Example 1 to obtain a polymer (5.0 g). The IR spectra of this polymer are shown in FIG. 2. It was found from the IR spectra and elementary analysis values of the polymer that the polymer was a p-chlorostyrene-sulfone copolymer and had a composition of 60% by mol of p-chlorostyrene unit and 40% by mol of $SO_2$ unit. Further, the molecular weight ($M_w$) of the copolymer was 463,000 and the polydispersibili&y thereof was 2.2.

EXAMPLE 4

Figure 3:
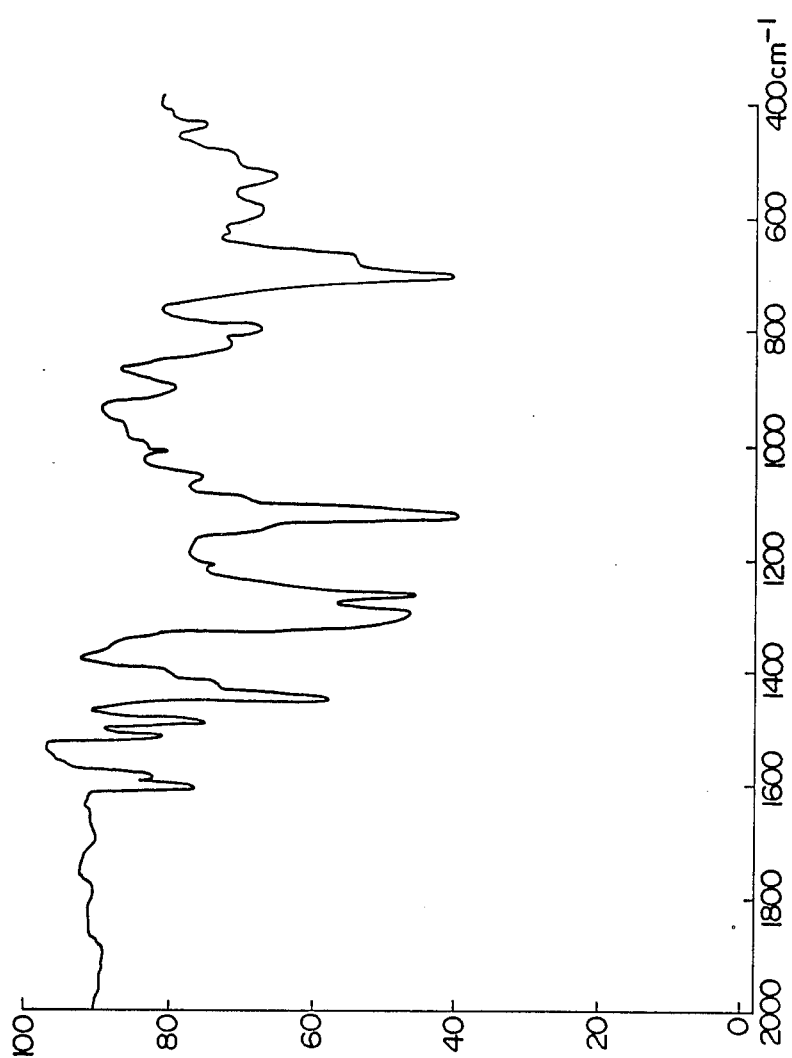

Into a 100 ml pressure glass tube were introduced newly distilled chloromethylstyrene (mixture of those of o- and p-forms) (45.8 ml) and azobisisobutyronitrile (91 mg), followed by removing oxygen inside the tube in the same manner as in Example 1, adding $SO_2$ ($-10°$ C.) (9 ml), sufficiently agitating the contents, reacting the contents at 30° C. for 25 hours, and carrying out post-treatment in the same manner as in Example 1 to obtain a polymer (6.3 g). The IR spectra of this polymer are shown in FIG. 3. It was found from the IR spectra and elementary analysis values of the polymer that the polymer was a chloromethylstyrene-sulfone copolymer and had a composition of 67% by mol of chloromethylstyrene unit and 33% by mol of $SO_2$ unit. Further, the copolymer had a $M_w$ of 320,000 and a polydispersibility of 2.0.

EXAMPLE 5

Figure 4:
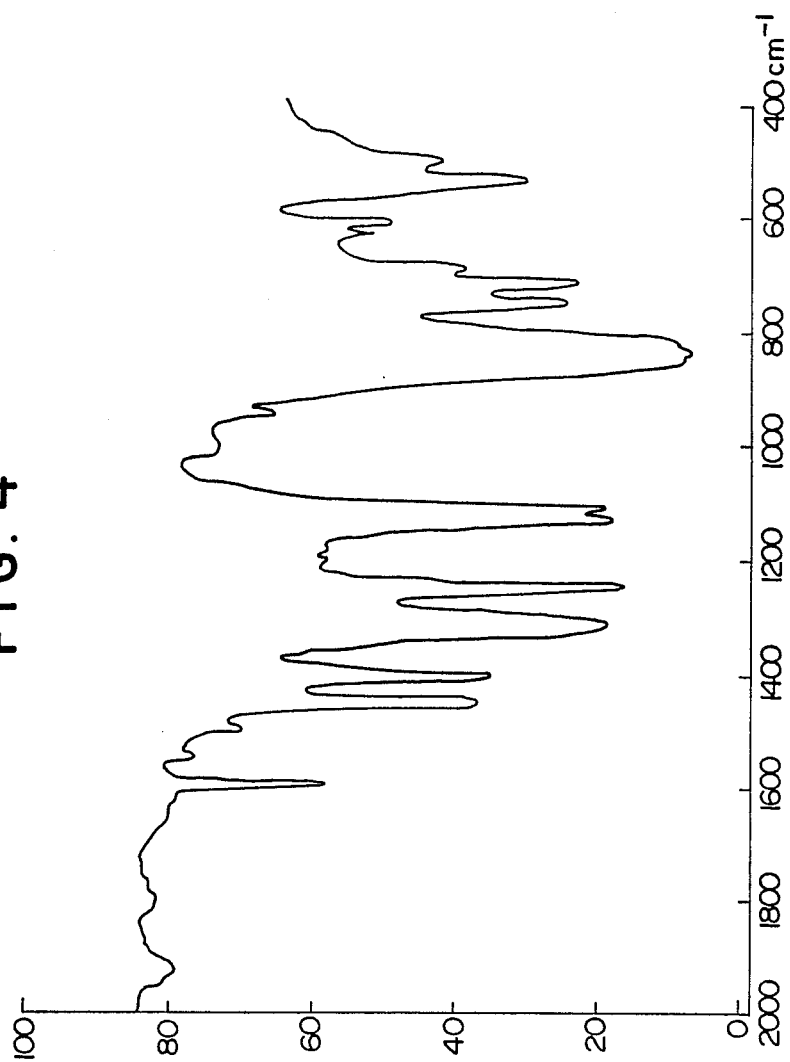

Into a 100 ml pressure glass tube were introduced newly distilled p-trimethylsilylstyrene (5.1 g) and azobisisobutyronitrile (40 mg), followed by removing oxygen inside the tube in the same manner as in Example 1, then adding 1-butene (16.5 g), further adding $SO_2$ ($-10°$ C.) (13.0 ml), sufficiently mixing the contents, reacting the contents at 50° C. for 24 hours and carrying out post-treatment in the same manner as in Example 1 to obtain a polymer (1.9 g). The IR spectra of this polymer are shown in FIG. 4. It was found from the IR spectra and elementary analysis values of the polymer that the polymer was a terpolymer of p-trimethylsilylstyrene-1-butene-sulfone and had a composition of 17% by mol of p-trimethylsilylstyrene unit, 38% by mol of 1-butene unit and 45% by mol of $SO_2$ unit. Further, this terpolymer had a $M_w$ of 168,000 and a polydispersibility of 2.3.

Test example 1

The terpolymer obtained in Example 5 was dissolved in methyl cellosolve acetate (MCA) to prepare a solution containing it in 7.0% by weight, several times filtering the solution with a Teflon filter of 0.2 μm, spin-coating the resulting solution onto a silicon wafer with a spinner at a rotation number of 2,000 rpm, baking the resulting film in an oven at 120° C. for one hour to remove remaining solvent. The coating at that time had a thickness of 0.48/μm.

The material was irradiated by electron beam by the use of an electron beam exposure apparatus while the exposed dose was varied at 20 Kev.

Next, the resulting substrates were immersed in a mixed solvent of dioxane-isopropanol (1:8 ratio by volume) at room temperature for one minute, followed by rinsing them with isopropanol for 30 seconds for development, and then carrying out post-baking in an oven at 120° C. for 30 minutes.

The remaining coatings of the thus obtained respective patterns were measured by a mechanical stylus surface profiler, and the exposed doses (sensitivity) at the parts where the remaining coatings were completely removed were sought to give $7 \times 10^{-6} C/cm^2$.

Further, as to the resistance to etching of these resists, etching was carried out for 10 minutes by means of a parallel flat plate type plasma reactor under conditions of $CCl_4$ gas, flow rate: 150 ml/min., RF power density: 0.64 W/cm² and pressure: 10 Pa to give an etching rate of 320 ° Å/min.

Test example 2

From the bipolymer obtained in Example 4 was prepared a solution of MCA in 5.0% by weight, followed by filtering, coating and prebaking in the same manner as in Test example 1. The film thickness at that time was 0.40 μm. The resulting material was subjected to irradiation of electron beam by the use of an electron beam exposure apparatus while the exposed dose was varied.

The resulting samples were then immersed in a mixed solvent of dioxane 9: isopropanol 5 (each, ratio by volume ) at 25° C. for one minute, followed by rinsing them with isopropanol for 30 seconds for development and thereafter subjecting them to postbaking at 120° C. for 30 minutes. In the case of this Test exmaple, non-irradiated areas completely dissolved and irradiated areas cured by crosslinking so that the thicknesses of the remaining films were measured by a mechanical stylus surface profiler and the exposed does at the cured areas of 0.3 μm thick in terms of sensitivity were sought to give $1 \times 10^{-6}$ C/cm².

Further, as to the resistance to etching of these resists, etching was carried out by means of the same reactor as in Test example 1 under conditions of $CF_4 + 5\%$ $O_2$ gas, flow rate: 200 ml/min., RF power density: 0.24 W/cm² and pressure: 10 Pa to give an etching rate of 550Å/min. In addition, the etching rate of a novolak resin (AZ-1350J, tradename) used for comparison was 530 Å/min.

Test examples 3 and 4

The resistance to etching of the p-chlorostyrene-sulfone bipolymer obtained in Example 3 was measured in the same manner as in Test examples 1 and 2.

Further, in Test example 4, the resistance to etching of a styrene-sulfone copolymer (composition molar ratio of 6:4) was measured. The results are shown in Table 1 together with those of the etching rate of the resin AZ-1350-J used for comparison.

TABLE 1

| Gas | $CF_4 + 5\%$ $O_2$ | $CCl_4$ |
|---|---|---|
| Test ex. 3 | 610 Å/min. | 280 Å/min. |
| Test ex. 4 | 540 Å/min. | — |
| AZ-1350-J | 530 Å/min. | 290 Å/min. |

EXAMPLE 6

Into a 150 ml pressure glass tube were introduced azobisisobutyronitrile (84 mg) and newly distilled p-trimethylsilylstyrene (44.1 ml), followed by removing oxygen inside the tube by repeated degassings in vacuo, adding to the contents, $SO_2$ (−10° C.) (6.6 ml) dried with $P_2O_5$, and sufficiently mixing these. The resulting mixed solution exhibited pale yellow color and it was seen that there was formed a charge transfer type complex.

The reaction was carried out at 35° C. for 24 hours, followed by cooling the tube down to 0° C. or lower, terminating the reaction, opening the tube, withdrawing $SO_2$ gas and carrying out post-treatment in the same manner as in Example 1 to obtain a polymer (5.0 g). Its elementary analysis values were as follows:

C % =63.06, H % =7.48, S % =7.21.

Figure 5:
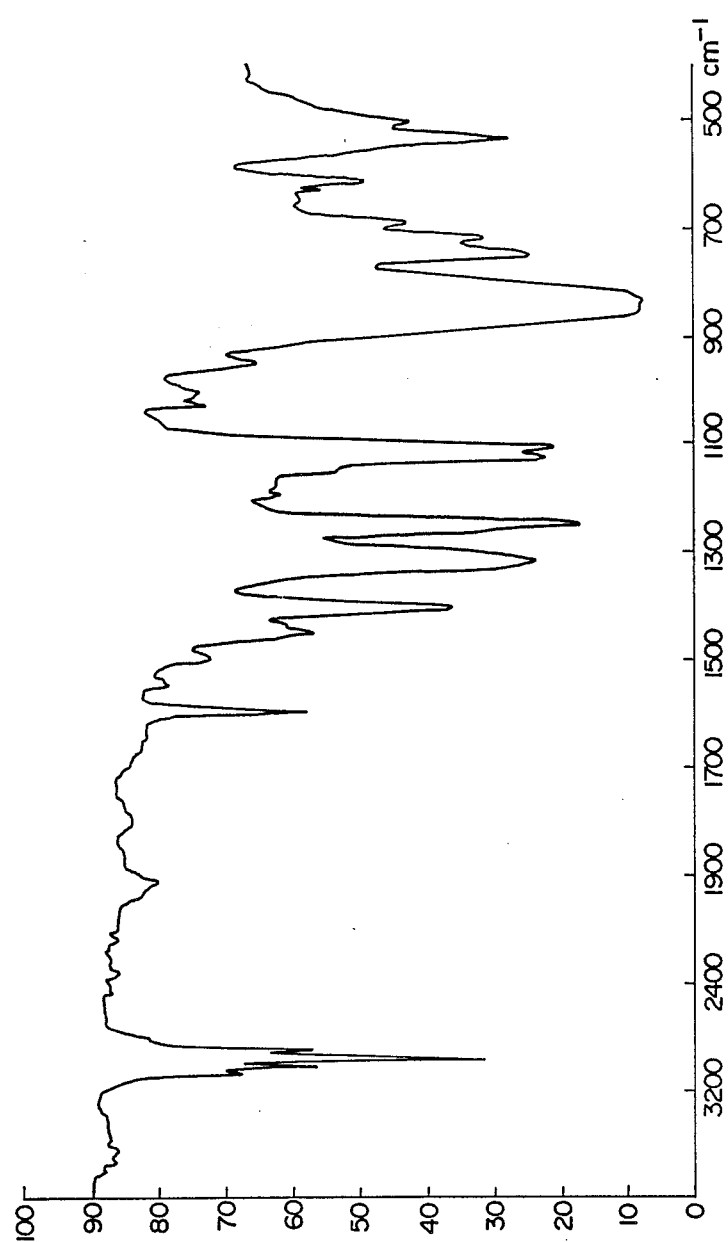

Further, its IR spectra are shown in FIG. 5. As apparent from the IR spectra and elementary analysis, the polymer was a p-trimethylsilylstyrene-sulfone copolymer and it was found that the polymer had a composition of 66.7% by mol of trimethylsilylstyrene unit and 33.3% by mol of sulfone unit.

Further, this polymer was subjected to GPC analysis to give a number-average molecular weight ($M_N$) of 187,000 and a d of 2.5.

EXAMPLE 7

Into a 150 ml pyrex glass tube were introduced newly distilled p-trimethylsilylstyrene (31 ml) and t-butyl hydroperoxide (0.08 ml), followed by sufficiently mixing these, immediately cooling, degassing in vacuo, successively adding to the reaction tube, $SO_2$ (−10° C.). (5 m dried with $P_2O_5$ and mixing these. The mixed solution exhibited a pale yellow-brown color. The reaction was carried out at −40° C. for 24 hours, followed by successively removing unreacted $SO_2$ under reduced pressure, and carrying out post-treatment as in Example 6 to obtain a polymer (5.0 g), which was then subjected to IR spectral analysis. As a result, it was found that the polymer was a p-trimethylsilylstyrene-sulfone copolymer. Further it was found from its elementary analysis values (C% =59.69, H% =7.29 and S% =10.3) that it had a composition of 58.3% by mol of trimethylsilylstyrene unit and 41.7% by mol of sulfone unit. The polymer was subjected to GPC analysis to give a number-average molecular weight ($M_N$) as calculated in terms of polystyrene, of 59,000 and a d of 2.4.

EXAMPLE 8

Into a 300 ml pyrex glass tube were introduced newly distilled p-trimethylsilylstyrene (117.3 ml) and pyridine (2 ml), followed by degassing the contents in vacuo, and adding to the reaction tube, $SO_2$ (−10° C.) (17.6 ml) dried with $P_2O_5$, sufficiently mixing these. The mixed solution exhibited a pale yellow color. It was cooled down to −70° C. with dry ice-methanol, followed by irradiating it with γ-rays of $3.8 \times 10^4$/h rad over 10 hours during which it was always kept at −70° C., thereafter opening the reaction tube, adding tetrahydrofuran (100 ml) cooled down to −70° C. to prepare a uniform solution of the reaction mixture inside the tube, introducing $N_2$ gas thereinto to remove $SO_2$ and carrying out post-treatment as in Example 6 to obtain a polymer (2.4 g).

This polymer was subjected to IR spectral analysis and elemental analysis. As a result, this polymer was a p-trimethylsilylstyrene-sulfone copolymer and had a composition of 52.4% by mol of p-trimethylsilylstyrene unit and 47.6% by mol of sulfone unit. The copolymer obtained in this Example (having a composition very close to that of alternating copolymer) dissolved very well in general-purpose solvents such as tetrahydrofuran, dioxane, chloroform, methyl cellosolve acetate, etc.

Further, as shown in Test example 7 mentioned later, it was possible to form a uniform film on the substrate according to spin coating process, using the copolymer in the form of solution.

Still further, the polymer was subjected to GPC analysis to give a number-average molecular weight of 95,000 and a d of 2.9.

Test Example 5

The copolymer obtained in Example 6 was dissolved in MCA to prepare a solution thereof in 6.3% by weight, followed by filtering the solution through a Teflon filter of 0.2 μm, spin-coating the solution onto a silicon wafer at a rotation number of 1,500 rpm and prebaking the coated material in an oven at 120° C. for one hour. The film thickness after the prebaking was 0.48 μm.

This material was subjected to irradiation of electron beam under an accelerated voltage of 20 KV and in various doses. The irradiated material was developed according to immersion process, using a mixed solvent of dioxane and isopropanol (1 :5 ratio by volume) at room temperature for one minute, followed by rinsing it with isopropanol for 30 seconds, and then post-baking in an oven at 120° C. for 30 minutes. The thickness of film of the thus obtained respective patterns was measured by a mechanical stylus surface profiler, to determine the zero point of the thickness of the remaining film. The sensitivity of this sample was $3\times10^{-5}$ C/cm.

Further, as to the resistance to etching of this resist, etching was carried out for 10 minutes by means of a parallel flat plate type etching reactor under conditions of $CCl_4$ gas, flow rate: 150 ml/min., RF power density: 0.64 W/cm2 and pressure: 10 Pa to give an etching rate of 220 Å/min. In addition, the etching rate of a novolak resin (AZ-1350J, tradename) used for comparison was. 290 Å/min.

EXAMPLE 9

Into a 150 ml pyrex glass tube were introduced p-trimethylsilylstyrene (17 ml) and t-butyl hydroperoxide (0.068 ml), followed by mixing these, then immediately cooling, repeating vacuum degassing to remove oxygen inside the tube, adding to the resulting material, $SO_2$ (12 m%) ($-10°$ C.) dried with $P_2O_5$ in vacuo, and sufficiently mixing these. The resulting mixed solution exhibited a pale yellow color.

Polymerization was carried out at $-50°$ C. for 20 hours, followed by dissolving the reaction mixture in acetone (80 ml), introducing $N_2$ gas to remove unreacted $SO_2$ gas, introducing the resulting acetone solution into a large quantity of n-hexane with stirring to deposit a white polymer, and purifying and drying the polymer in the same manner as in Example 7 to obtain 2.7 g of the polymer.

From the results of IR spectra analysis and the elementary analysis of the polymer, it was found that the polymer was p-trimethylsilylstyrene-sulfone copolymer (C% =54.45, H% =6.72) and also the polymer was an alternating copolymer having a composition of 50% by mol of trimethylsilylstyrene unit and 50% by mol of sulfone unit (mol ratio 1 : 1). Further the polymer was subjected to GPC analysis. As a result, its number-average molecular weight ($M_N$) as calculated in terms of polystyrene was 158,000 and the polydispersibility was 3.1.

EXAMPLE 10

Into a 150 ml pyrex glass tube were introduced p-trimethylsilylstyrene (4.5 ml), 2-methyl-1-pentene (21.5 ml) and t-butyl hydroperoxide (0.081 ml), followed by sufficiently mixing these, then immediately cooling, degassing in vacuo, then adding to the reaction tube, $SO_2$ (4.0 ml) ($-10°$ C.) dried with $P_2O_5$ through a vacuum line, and mixing these. The resulting mixed solution exhibited a pale yellow color. Polymerization reaction was carried out at $-78°$ C. for 20 hours, followed by carrying out post-treatment in the same manner as in Example 9 to obtain a white polymer (2.3 g).

From the results of IR spectra analysis of the polymer, it was found that the polymer was p-trimethylsilylstyrene-2-methyl-1-pentene-sulfone terpolymer, and also from the elementary analysis values (C: 53.13%, H: 7.11% and S: 17.44%), it was found that the polymer was a terpolymer having a composition of 30.4% by mol of trimethylsilylstyrene unit, 19.4% by mol of 2-methyl-1-pentene unit and 50.2% by mol of sulfone unit, and having trimethylsilylstyrene-sulfone and 2-methyl-1-pentene-sulfone bonded in a mol ratio of 1 : 1. Further, as a result of the GPC analysis of the polymer, its number-average molecular weight was 127,000 and its polydispersibility was 3.1.

TEST EXAMPLES 6-9

With the polymers obtained in Examples 7, 8, 9 and 10, the respective sensitivities thereof were measured in the same manner as in Test examples 5. The results are shown in Table 2.

As apparent from the Table, the nearer the composition ratio of p-trimethylsilylstyrene to $SO_2$ to 1, the more the sensitivity improved.

TABLE 2

| | Sensitivity measurement of polymer | | | |
|---|---|---|---|---|
| Test example No. | 6 | 7 | 8 | 9 |
| Example No. of used polymer | 7 | 8 | 9 | 10 |
| Dissolving solvent | MCA | Dioxane | MCA | MCA |
| Solution concentration | 7.0 wt % | 4.0 wt % | → | 5.0 wt % |
| Coating conditions | 1,500 rpm 1 min. | → → | → → | 1,000 rpm → |
| Prebaking conditions | 120° C. 1 hr. | →· → | → → | 100° C. 30 min. |
| Film thickness | 0.6 μm | 0.53 μm | 0.5 μm | 0.32 μm |
| Post-baking conditions | 120° C. 30 min. | → → | → → | → → |
| Sensitivity (C/cm²) | $8\times10^{-6}$ | $1\times10^{-6}$ | $1\times10^{-6}$ | $3\times10^{-6}$ |

What we claim is:

1. A copolymer from three or more monomers and having a number average molecular weight of 500 to 500,000 consisting of 1 to 50% by mol units of —$SO_2$— units and 50 to 99% by mol units of
   (1) at least one first member selected from the group consisting of chlorostyrene, acetoxystyrene, hydroxystyrene and trialkylsilylstyrene, and
   (2) at least one other member selected from the hereinafter defined groups (a), (b) and (c),
      group (a) consisting of styrene or chlorostyrene or acetoxystyrene, or hydroxystyrene or trialkylsilylstyrene,
      group (b) consisting of 1-butene or 2-methyl-butene or 2-methyl-pentene,
      group (c) consisting of trimethylvinylsilane and trimethylallylsilane
   wherein said other member is other than said first member.

2. A copolymer having a number average molecular weight of 500 to 500,000 consisting of 1 to 50% by mol units of —$SO_2$— units and 50 to 99% by mol units of at least two members selected from the group consisting of chlorostyrene, acetoxystyrene, hydroxystyrene and trialkylsilylstyrene.

3. A copolymer according to claim 2 wherein said trial kylsilylstyrene has the formula

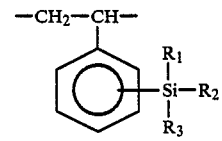

wherein $R_1$, $R_2$ and $R_3$ are each methyl.

4. A copolymer according to claim 3 wherein the trimethylsilyl group is bonded to the nucleus of said styrene at the o-, m- or p-position.

5. A copolymer according to claim 1, having repeating units represented by the structural formula

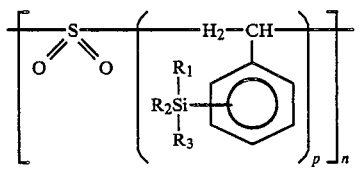

wherein p represents a sequence length of 1 to 5 and n represents an integer of 10 to 25,000.

6. A positive type resist material comprising as an active ingredient, a nucleus-substituted trialkylsilylstyrene-sulfone linear copolymer composed of 30 to 50 % by mol units of

units and 50 to 70% by mol units of

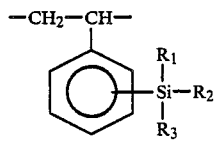

wherein $R_1$, $R_2$ and $R_3$ each represent a lower alkyl group, and having a number average molecular weight of 500 to 500,000.

7. A positive type resist material comprising as an active ingredient, a copolymer of four or more monomers comprising 30 to 50% by mol units of

units and 50 to 70% by mol units of at least two vinyl compounds and having a number average molecular weight of 25,000 to 500,000, said at least two vinyl compounds being composed of (1) at least one aromatic ring-containing vinyl compound and (2) at least one aliphatic olefin hydrocarbon as indispensable structural units and (3) a Si-containing vinyl compound as structural units.

8. A positive type resist material according to claim 7 wherein said at least one aromatic ring-containing vinyl compound (1) is at least one member selected from the group consisting of styrene, chlorostyrene, acetoxystyrene, hydroxystyrene and trialkylsilylstyrene; said at least one aliphatic olefin hydrocarbon (2) is at least one member selected from the group consisting of 1-butene, 2-methyl-1-butene and 2-methyl-1- pentene; and said Si-containing vinyl compound (3) is at least one member selected from the group consisting of trimethylvinylsilane and trimethylallylsilane.

* * * * *

UNITED STATES PATENT AND TRADEMARK OFFICE
CERTIFICATE OF CORRECTION

PATENT NO.   :   4,965,340
DATED        :   October 23, 1990
INVENTOR(S)  :   MATSUDA et al It is certified that error appears in the above-identified patent and that said Letters Patent is hereby corrected as shown below:

On cover page, insert second inventors name which was omitted --- [75] Hiroshi Ono, Yokohamashi, Japan ---.

Column 4, line 68, add ---②--- after "hydrocarbon".

Column 7, line 59, amend "aspect&" to --- aspect ---.

Column 10, line 66, amend "5m" to --- 5m$\ell$ ---.

Column 15, line 1 of the formula change "H$_2$" to --- CH$_2$ ---

Signed and Sealed this

Fifth Day of January, 1993

Attest:

DOUGLAS B. COMER

Attesting Officer        Acting Commissioner of Patents and Trademarks